United States Patent
Washburn

(10) Patent No.: US 6,370,753 B1
(45) Date of Patent: Apr. 16, 2002

(54) METHOD AND APPARATUS FOR WRAPPING AND INSTALLING CABLE

(75) Inventor: Robert B. Washburn, Amherst, OH (US)

(73) Assignee: Arnco Corporation, Elyria, OH (US)

( * ) Notice: Subject to any disclaimer, the term of this patent is extended or adjusted under 35 U.S.C. 154(b) by 0 days.

(21) Appl. No.: 09/621,851

(22) Filed: Jul. 24, 2000

(51) Int. Cl.[7] ............................................. B23Q 17/00
(52) U.S. Cl. ...................... 29/407.01; 29/714; 29/779; 29/819; 254/134.3 R; 254/134.4
(58) Field of Search ........................... 29/407.01, 433, 29/714, 728, 779, 819, 820, 241; 254/134.3 R, 134.4

(56) References Cited

U.S. PATENT DOCUMENTS

| | | | |
|---|---|---|---|
| 2,498,834 A | * | 2/1950 | Bennett et al. |
| 2,532,504 A | * | 12/1950 | Lapsley |
| 3,216,636 A | | 11/1965 | Kothe |
| 4,731,504 A | | 3/1988 | Achille et al. |
| 4,818,060 A | | 4/1989 | Arroyo |
| 4,836,640 A | | 6/1989 | Gartside, III et al. |
| 4,850,569 A | | 7/1989 | Griffioen et al. |
| 4,934,662 A | | 6/1990 | Griffioen et al. |
| 5,076,881 A | | 12/1991 | Ferguson |
| 5,082,348 A | | 1/1992 | Gartside, III et al. |
| 5,142,100 A | | 8/1992 | Vaupotic |
| 5,143,353 A | | 9/1992 | Sano et al. |
| 5,156,376 A | | 10/1992 | Spicer |
| 5,167,399 A | * | 12/1992 | Delomel |
| 5,234,198 A | * | 8/1993 | Hale et al. |
| 5,253,318 A | | 10/1993 | Sayegh et al. |
| 5,345,526 A | | 9/1994 | Blew |
| 5,416,874 A | | 5/1995 | Giebel et al. |
| 5,542,020 A | | 7/1996 | Horska |
| 5,636,551 A | | 6/1997 | Davidson et al. |
| 5,681,131 A | | 10/1997 | Goldenberg et al. |
| 5,689,601 A | | 11/1997 | Hager et al. |
| 5,813,658 A | | 9/1998 | Kaminski et al. |
| 5,835,658 A | | 11/1998 | Smith |
| 5,838,864 A | | 11/1998 | Patel et al. |
| 5,850,055 A | | 12/1998 | Bosisio et al. |
| 5,884,384 A | * | 3/1999 | Griffioen |
| 5,905,833 A | | 5/1999 | Sheu |
| 6,010,788 A | | 1/2000 | Kebabjian et al. |
| 6,179,269 B1 | * | 1/2001 | Kobylinski |
| 6,267,355 B1 | * | 7/2001 | Fletcher |

* cited by examiner

*Primary Examiner*—David P. Bryant
(74) *Attorney, Agent, or Firm*—Pearne & Gordon LLP

(57) ABSTRACT

A machine for installing a plurality of cables together in a duct comprising a cable pushing machine and a cable wrapper. The cable wrapper comprises a platform rotatably attached to a mount. The platform and mount have aligned bores therethrough. Coils of winding media are attached to the platform. Cables pass through the bores, and the winding media is dispensed onto the cables. The platform rotates as the winding media is dispensed, thus wrapping the winding media around the cables. The cables are then passed through the cable pusher and into the duct. The rotation of the platform may be driven by the movement of the cables, or by independent means such as a motor.

31 Claims, 4 Drawing Sheets

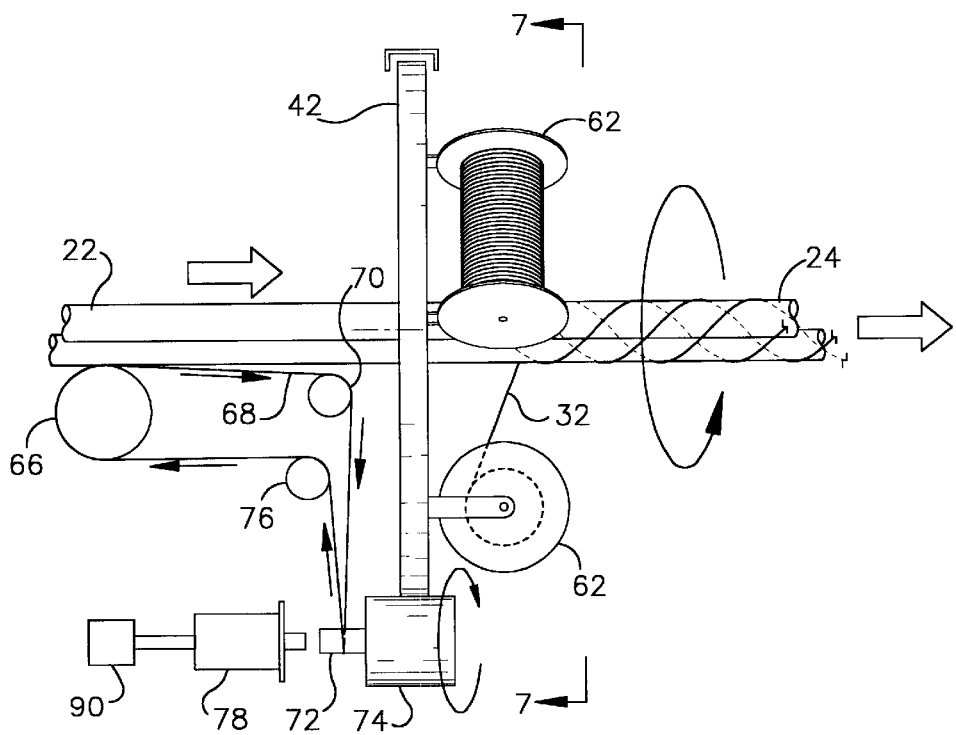
Fig.6
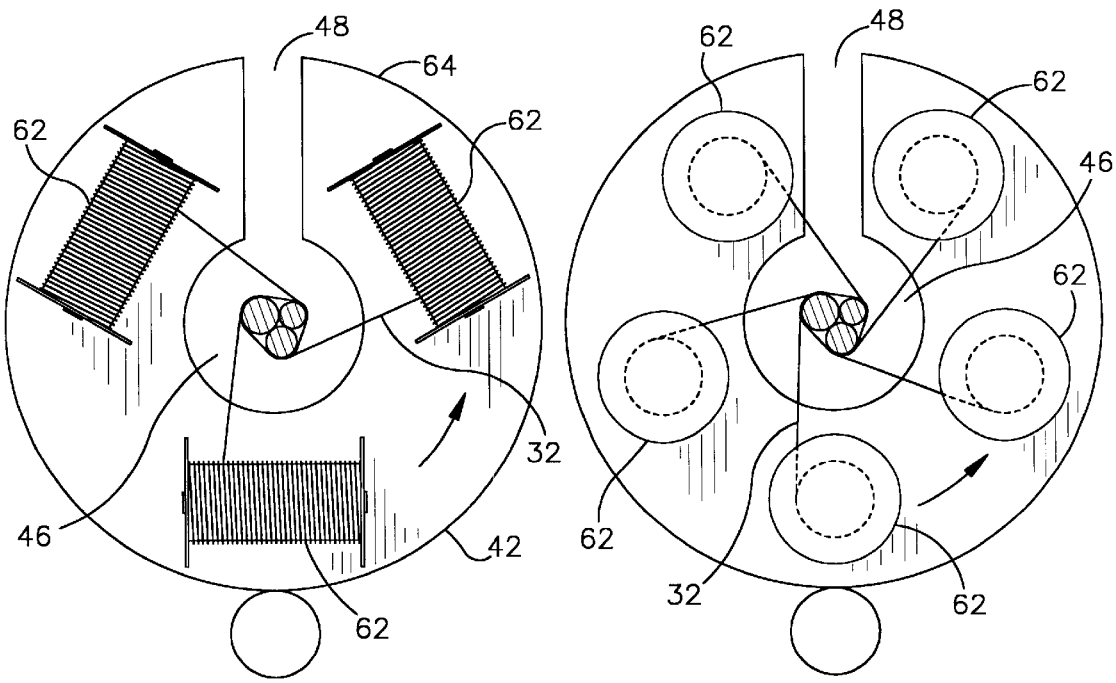
Fig.7                    Fig.8

METHOD AND APPARATUS FOR WRAPPING AND INSTALLING CABLE

This invention relates to cable pushing machines. More specifically, it relates to a machine for wrapping cable together prior to installation and subsequently pushing it into a conduit or duct.

BACKGROUND OF THE INVENTION

The installation of electrical or other cables often involves feeding a number of cables together through a length of underground duct or conduit. For example, power cables, such as secondary cables are typically bundled in three's—two hots and a neutral. In this way, a primary high voltage cable is brought into a transformer. The voltage is stepped down and/or split into phases, and sent out of the transformer as low voltage, high amperage supply lines. Power supply to homes also involves a plurality of power cables and generally involves significant distances that the three secondary cables must travel in an underground duct between the transformer and the service entrance. It is not unusual for one transformer to feed a number of homes, for example, 2 to 4 homes. Pulling the cables in place through the duct involves transporting and setting up heavy equipment at each final destination. If cables are pushed through the underground duct, the cable reel and pusher are set up only once at the transformer, and the cable is pushed to each of the service locations, saving considerable time and money.

Because the cables are fairly heavy, and the distances the cables must travel in the underground ducts possibly significant, the pushing force necessary may rise to several hundred pounds. Depending on the free clearance for the cable inside the duct, the cables have a tendency to buckle, which induces them to deflect laterally against the duct wall, thus resisting further movement. It has been found that if the cables are wrapped prior to installation, their resistance to buckling improves significantly, thus allowing higher pushing forces to be applied.

One solution would be to have cable suppliers parallel and pre-wrap cables prior to winding them on the master reel. The problem with this is that it is expensive, time consuming and unwieldy. Also, the winding media must be sufficiently flexible so as to allow the cables to bend on the reel and recover when uncoiled.

These problems are solved by the present invention, which provides for the wrapping of cables together at the point of installation. On-site wrapping has several advantages. First, a number of cables can be wrapped together, which provides more resistance to buckling. This means that larger axial forces can be applied to the cables, and thus, they can be pushed greater distances. Second, the cables may be unrolled and straightened prior to wrapping. This results in a straighter and stiffer product. Third, a wider variety of winding media may be used because the media is not wound on the cable reels along with the cables. Fourth, installation of the cables is faster because the cables deflect within the duct less often. As on-site wrapping requires less employee-hours to deal with deflected cables that become jammed in the duct, it is also less expensive.

Thus, a portable cable wrapping and pushing machine are provided to allow the user to wrap cables at the point of installation. A method of wrapping and installing cables is also provided.

SUMMARY OF THE INVENTION

This invention includes a machine for wrapping a plurality of cables together before installation that includes a cable pushing machine and a platform upstream of the cable pushing machine. The platform is provided with an opening through which the cables may pass. The machine also includes a mount for the platform that allows the platform to rotate about the opening, a coil of winding media mounted on the platform, and a drive mechanism for rotating the platform so that the winding media may wrap the cables as they move through the opening in the platform.

A method of installing a plurality of cables in a duct is also provided. The method comprises gathering a plurality of cables together, feeding the plurality of cables through an opening in a platform, then feeding a winding media gathered on the platform onto the plurality of cables. The winding media is rotated around the plurality of cables, while the cables are propelled along a path through the opening in the platform. In this way, the winding media is wrapped in a spiral around the plurality of cables. Finally, the cables are fed into the duct.

BRIEF DESCRIPTION OF THE SEVERAL VIEWS OF THE DRAWING

A fuller understanding of the invention may be had by referring to the following description and claims, taken in conjunction with the accompanying drawings, wherein:

FIG. 6 is a top plan view of a second embodiment of the platform.

FIG. 7 is a cut-away view thereof, taken along line 7—7.

FIG. 8 is an alternate cut-away view thereof, taken along line 7—7.

DETAILED DESCRIPTION OF THE PREFERRED EMBODIMENTS

Figure 1:
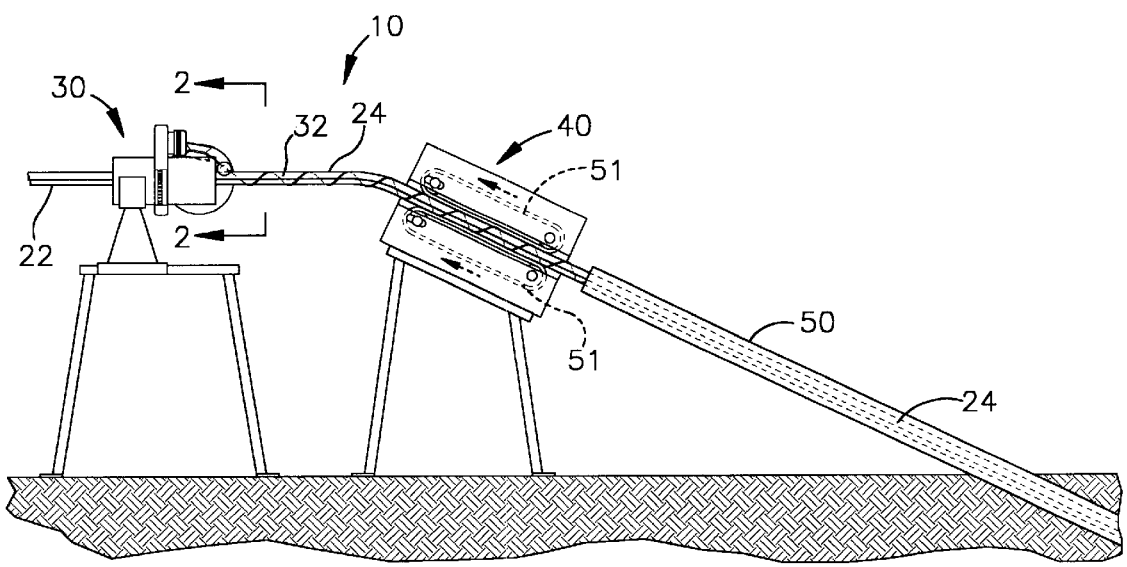
FIG. 1 is a perspective view of the machine for wrapping cables of the present invention.
Figure 2:
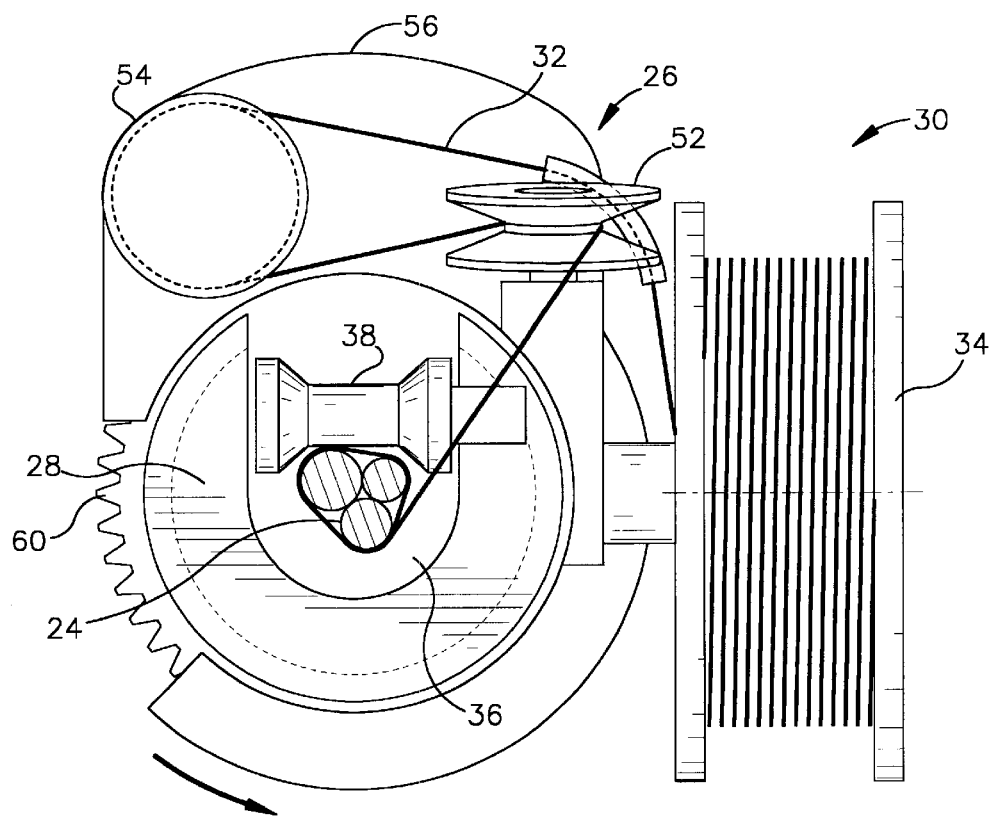
FIG. 2 is a cut-away view of the platform, taken along line 2—2.

With reference now to FIG. 1, there is shown an apparatus 10 for installing a plurality of cables 22 in a duct or conduit 50 comprising a wrapping machine 30 and a cable pusher 40. The plurality of cables 22 are fed together through the wrapping machine 30 where they are bound or wrapped together with a winding media 32 to form a bundle of cables 24. The bundle proceeds through the cable pusher 40, which is a cable pusher as is known in the art. A suitable cable pusher is disclosed in U.S. Pat. No. 5,813,658, the contents of which are hereby incorporated by reference.

The cable pusher 40 generally comprises a pair of tractor belts 51, which rotate in opposite directions, i.e. one rotates clockwise, the other counter-clockwise, as illustrated in FIG. 1. The bundle 24 passes between and in contact with the belts 51. The movement of the belts 51 operates to apply sufficient force to the bundle 24 to push the bundle 24 through the duct 50.

The cable 22 may be telecommunications cable, flexible or semi-flexible power cable, or a fiber-optic cable. The cable 22 typically has a length of 100 to 2000 feet, more preferably 100 to 1000 feet, more preferably 100 to 500 feet, and has a diameter of ⅛" to 2½", more preferably ⅜" to 1¼". Other sizes of cable may be wrapped as long as wrapping machine 30 and cable pusher 40 are sized to accommodate the cables. The plurality of cables to be wrapped together can be wound on one cable reel, or on a plurality of cable reels. The cables are unwound, straightened, then gathered together prior to being fed into the wrapping machine 30.

The wrapping machine 30 can be one of several different varieties. Illustrated in FIGS. 2–5 is a single-wrapping machine. The wrapping machine 30 comprises a platform 26 and a mount 28. The platform 26 is rotatably attached to the mount 28. The term platform is used to mean any type of support for the media of any shape or structure. The platform 26 and the mount 28 have aligned openings or bores (indicated together as 36) that are sized to be of sufficient size for the cables 22 to pass therethrough. The mount 28 is also provided with a guide roller 38 which acts to keep the cables 22 in place as they pass through the bores 36.

A coil or spool 34, a guide pulley 52, a drive roller 54 and a gear box 56 are attached to the platform 26. The winding media 32 is initially wrapped around the coil 34. Alternatively, a plurality of winding media may initially be wrapped around the coil 34. The coil 34 dispenses the winding media 32 around the drive roller 54. The winding media 32 then passes around the guide pulley 52 and onto the cables 22. The motion of the cables 22 pulls the winding media 32 off of the coil 34 and around the drive roller 54.

Figure 3:
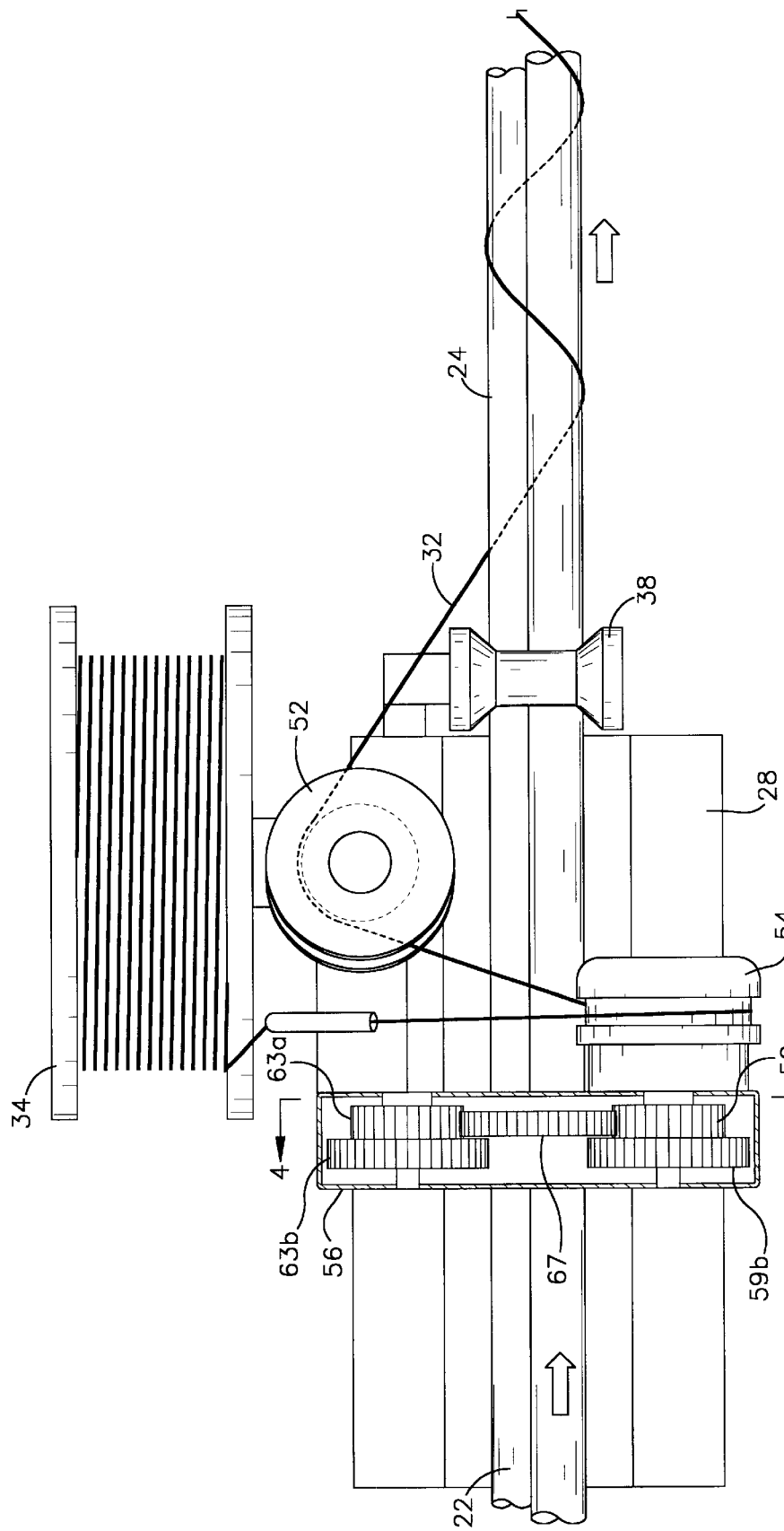
FIG. 3 is a top plan view thereof.
Figure 4:
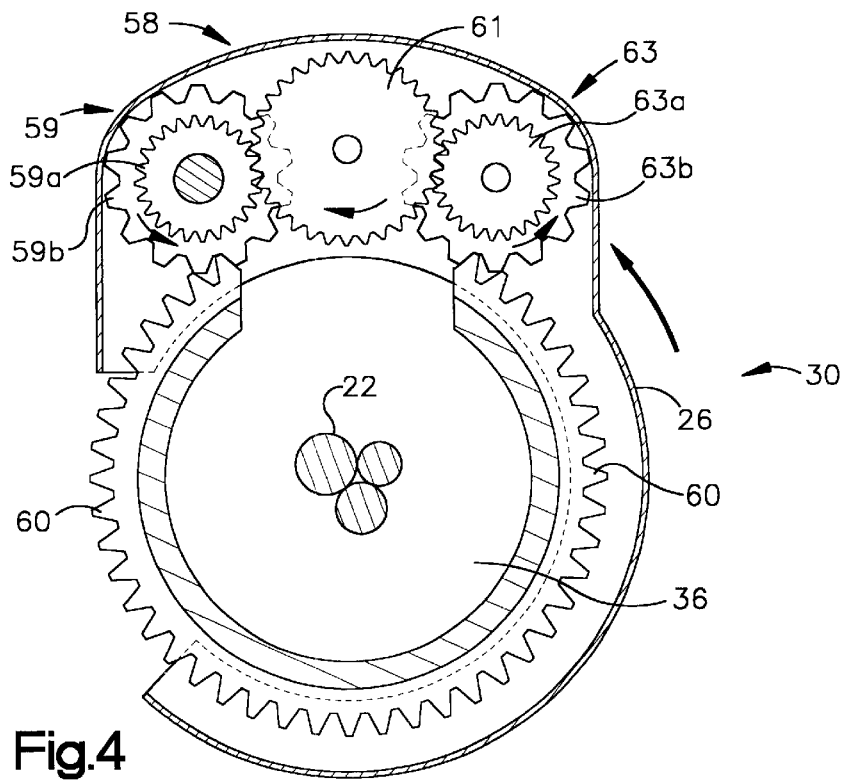
FIG. 4 is a cut-away view of the platform, taken along line 4—4.
Figure 5:
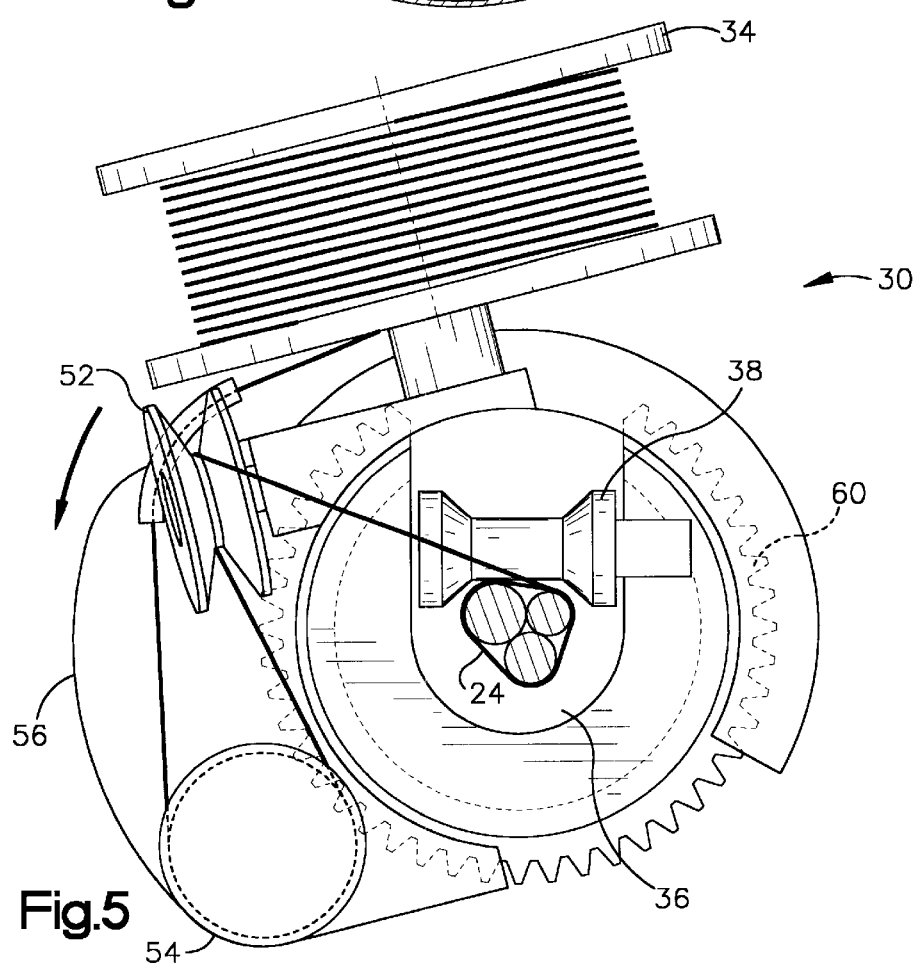
FIG. 5 is a cut-away view of the platform similar to FIG. 2, showing the platform after partial rotation.

The drive roller 54 is connected to the gear system 58, which is illustrated in FIGS. 3–4. Gear system 58 comprises a plurality of gears, preferably three gears 59, 61, and 63. The gear 59 that is connected to drive roller 54 comprises two gear portions, 59a and 59b that are fixedly attached to each other and thus, rotate together. As gear portion 59a rotates, it engages gear 61, which in turn, rotates in the opposite direction as the direction of rotation of gear 59. Gear 61 in turn engages gear 63, which also comprises two gear portions, 63a and 63b that are fixedly attached to each other and thus, rotate together.

As indicated in FIG. 4, gears 59 and 63 rotate in the same direction. As they rotate, the two gear portions 59b and 63b which do not engage gear 61, instead engage a set of gear teeth 60, which is fixedly formed around the outer surface of the mount 28, causing the platform 26 to rotate around the mount 28. Thus, as the cables 22 pass through the bores 36 and draw the winding media 32 off of the coil 34, the platform 26 rotates around the mount 28 and the cables 22, thus wrapping the winding media 32 around the cables 22.

Another embodiment of this invention, namely a triple-wrapping machine is shown in FIGS. 6–8. The triple-wrapping machine comprises a platform 42, which is rotatably attached to a mount 44, and a drive mechanism for rotating platform 42. The platform 42 has an opening or bore or aperture 46 that is large enough for the cables 22 to pass therethrough. The platform 42 is also provided with a channel or slot 48 which communicates with the opening 46 and also passes through the outer edge 64 of the platform 42. The channel 48 allows the cables 22 to be easily placed into and be removed from the opening 46.

In this embodiment, the rotation of the platform 42 may be driven by the movement of the cables 22 through the opening 46, or by independent means. In the former case, the cables 22 contact a roller 66 and a belt 68 either prior to (shown in FIG. 6) or after passing through the platform 42. This contact causes the movement of the belt 68 in the same direction as the direction of travel of the cables 22 through the platform 42. Additional rollers 70 and 76 are positioned to reorient the belt 68 so that it may engage and turn a shaft 72, which in turn, engages a rotation wheel 74. The motion of the belt 68 turns the shaft 72, thus driving the rotation wheel 74. The rotation wheel 74 is in contact with the platform 42, causing the rotation of the platform 42 in a direction opposite the direction of the rotation of the rotation wheel 74.

In some cases, it may be desirable to be able to change the pitch of the winding during operation. The pitch of the winding refers to the number of rotations around the cables 22 made by the winding media 32 per foot of length of the cables 22. The pitch of the winding may be varied if the speed of rotation of the platform 42 can be changed relative to the speed of the cables 22 moving through the platform 42.

Belt 68 can be configured to engage various sizes of rollers 66, 70 and 76 during operation. When belt 68 shifts to a different sized roller, the speed of the platform 42 changes, without the speed of the cables 22 changing. As a result, the pitch of the winding around the cables 22 changes.

An independent, variable-speed motor 78 can be used to turn the shaft 72 and ultimately rotate the platform 42. In this case, the movement of the cables 22 is not used to rotate the platform 42. Instead, an independent power source is used to rotate the platform 42. However, because the rotation of the platform 42 is completely independent from the movement of the cables 22 through the platform 42, the pitch of the winding around the cables 22 may be varied during operation.

If the pitch of the winding is variable, a feedback loop may be incorporated to regulate the pitch in a proportional manner to the speed of the cable 22. Feedback loops can be established either by directly monitoring the speed of the cable 22, or indirectly through monitoring the tension in the cable span between the wrapping machine and pushing unit. Various mechanical methods exist, and are known in the art, to create a scalable signal that can be fed back into the drive control on the wrapping machine to maintain synchronized speed control.

Direct speed indicators, or encoders, typically involve an electronic or photo-optic pulse generator. The system utilizes a wheel of fixed diameter rotationally in contact with the moving cable. Rotation of the wheel can generate a pulse inductively by rotating the teeth of a gear in front of a fixed inductive sensor, or as a generator by rotating a coil in a magnetic field, or photo-optically by rotation of a photo-masked disk between a light and a photo detector. The analog or digitized signal so generated can be used as a reference control signal to a variable-speed DC or AC motor drive.

The indirect speed control senses the relative speed of the cable 22 by the slack or tension that exists in the cable members spanning the distance between the wrapping machine and pushing unit. Non-contact means can sense the vertical displacement in the catenary so formed by the slack in the cable. These sensors would include IR or ultrasonic sensors. Contact sensors would include either a rotatable arm, which in return can rotate a potentiometer, or a linearly displaceable transducer such as a linearly variable differential transducer "LVDT"). These means can be effective so long as there is a vertically displaceable catenary between machines. However, because very stiff cables and windings complicate this condition, an improved method would involve measuring the tension in the cable 22 members by means of the force necessary to deflect them perpendicular to the cable axis when loaded in 3-point flexure.

In this method two fixed bottom rolls cradle the wrapped cable members while a variably displaceable wheel is oriented between these rolls and 180 degrees out. An LVDT or load cell fixed to this middle wheel then can generate a signal proportional to the tension in the cable 22. This signal again can be scaled and used as a control signal to coordinate the speed of the winding unit.

A pulling system attached to a free end of the cable by a winch line may also be utilized to pull the cable in conjunction with the pushing action.

As illustrated in FIGS. 7–8, one or more coils 62, are rotatably mounted on the platform 42. The coils 62 may be mounted such that their longitudinal axes are parallel to the plane in which the platform 42 rotates (shown in FIG. 7). Alternatively, a number of coils 62, for example five, may be rotatably mounted with their longitudinal axes perpendicular to the plane in which the platform 42 rotates (shown in FIG. 8).

The winding media 32 may be any media which is strong enough to keep the cables 22 bound together as they pass through the duct 50. The winding media 32 is made of material that exhibits relatively high elongation. Preferably, the material fully recovers within a range of 5% to 50% elongation. The winding media 32 may have a wide, low-profile shape, similar to that of conventional tape. This helps ensure that the winding media 32 has the strength to hold the bundle 24 together, and also helps reduce the resistance to movement of the bundle 24 through the duct 50. The winding media may be ⅛" to 2" wide, preferably ⅛" to 1" wide. Alternately, the winding media may be stainless steel or soft iron wire which is usually about 0.020 to 0.080 inch diameter.

The winding media 32 may comprise a low-friction surface and a high-friction surface. The high-friction surface is in contact with the bundle 24, thus helping to keep the winding media 32 from sliding along the length of bundle 24 as they pass through the duct 50. It preferably will not impede the dispensing of the winding media 32 onto the cables 22, yet is tacky enough that it will not slip along the cables 22 under load. The high-friction surface may have a tackifying resin incorporated into the material itself, or it may have an adhesive layer applied externally.

The low-friction surface contacts the inside walls of the duct 50, helping to reduce the force necessary to move the bundle 24 through the duct 50. Preferably, it is designed not to transfer any lubricous materials to the tractor belts 51 as it passes through the cable pusher 40. The low-friction surface may contain an extrusion-bound lubricous material such as, but not limited to consisting of silicone, teflon, graphite and fatty acid esters and/or amide such as erucamide. Alternatively, it may comprise a lubricating material applied externally.

Examples of materials suitable for winding media include, but are not limited to polyethylene, polypropylene, nylon (polyamide), polyethylene-terephthalate (PET), polyvinyl-chloride (PVC), polytetrafluoroethylene (PTFE), polyvinylidene fluoride (PVDF), thermoplastic elastomers of polyamides, polyolefins, polyesters, polyurethane and polymer alloys thereof. These materials may be used in tape form or in filament form. Both lubricating or tackifying agents may be incorporated to produce the desired properties described above.

It should be evident that this disclosure is by way of example, and that various changes may be made by adding, modifying or eliminating details without departing from the fair scope of the teaching contained in this disclosure. The invention is therefore not limited to the particular details of the disclosure except to the extent that the following claims are so limited.

What is claimed is:

1. A machine for installing a plurality of cables together in a duct comprising:
   a cable pushing machine,
   a platform, the platform having an opening through which the cables may pass,
   a mount for the platform which allows the platform to rotate about the opening,
   a coil of winding media mounted on the platform, and
   a drive mechanism for rotating the platform so that the winding media may wrap the cables as they move through the opening in the platform.

2. The machine of claim 1 wherein there is a plurality of coils which are mounted with their longitudinal axes substantially parallel to the platform and the winding media from them winds onto the cables.

3. The machine of claim 1 wherein there is a plurality of coils which are mounted with their longitudinal axes substantially perpendicular to the platform and the winding media from them winds onto the cables.

4. The machine of claim 1 wherein the drive mechanism translates the motion of the cables to rotate the platform holding the coils so that the movement of the cables powers the rotation of the platform.

5. The machine of claim 1 further comprising a rotation wheel that engages the platform and a contact roller that contacts at least one cable and a belt, the belt being placed around the contact roller and connected to the rotation wheel, such that the motion of the cable drives the roller, which further drives the belt, which further drives the rotation wheel which further rotates the platform.

6. The machine of claim 1 wherein the drive mechanism for rotating the platform is a motor and operative drive mechanism.

7. The machine of claim 6 wherein the operative drive mechanism comprises a rotation wheel which engages the platform and is in contact with the motor, wherein the operation of the motor drives the rotation wheel which further rotates the platform.

8. The machine of claim 6 wherein the motor is a variable speed motor.

9. The machine of claim 8 further comprising a means for generating a feedback control signal by means of directly coupling an encoder with the moving cable.

10. The machine of claim 8 further comprising an AC or DC variable speed drive configured to vary the speed of the motor in response to a feedback signal.

11. The machine of claim 1 wherein the winding material is a wide, low-profile material.

12. The machine of claim 11 wherein the winding material has a width of about ⅛" to about 2".

13. The machine of claim 1 wherein the winding material has an elasticity such that the winding material fully recovers after elongation of 5% to 50%.

14. The machine of claim 1 wherein the winding material has first and second surfaces, the first surface being a low-friction surface and the second surface being a high-friction surface.

15. The machine of claim 14 wherein the first surface contains an extrusion-bound lubricous material selected from the group consisting of silicone, teflon, graphite and fatty acid esters or fatty acid amides.

16. The machine of claim 14 wherein the first surface comprises an externally-applied lubricating material.

17. The machine of claim 14 wherein the second surface comprises an externally-applied tackifying material.

18. The machine of claim 14 wherein a tackifying resin is integrated into the second surface.

19. The machine of claim 1 wherein the winding media is selected from the group consisting of polyethylene, polypropylene, nylon, polyethylene-terephthalate (PET), polyvinyl-chloride (PVC), polytetrafluoroethylene (PTFE), polyvinylidene fluoride (PVDF), thermoplastic elastomers of polyamides, polyolefins, polyesters, polyurethanes and polymer alloys thereof.

20. The machine of claim 1, wherein the winding media comprises either stainless steel or soft iron wire.

21. A method of installing a plurality of cables in a duct comprising:

gathering a plurality of cables together, feeding the plurality of cables through an opening in a platform, feeding a winding media gathered on the platform onto the plurality of cables, rotating the winding media around the plurality of cables, propelling the cables along a path through the opening in the platform, thus wrapping the media around the plurality of cables, and feeding the plurality of cables into the duct.

22. The method of claim 21 wherein the cables are provided wound on at least one cable reel, further comprising, prior to the gathering step, the steps of:

unrolling lengths of cable from the cable reels, and applying a force to the cables sufficient to leave the cables in a condition wherein the cables are substantially straight.

23. The method of claim 21, wherein said cables pass through approximately the center of the platform, further comprising the step of:

rotating the platform about the cables.

24. The method of claim 23, wherein the rotation of the platform is driven by dispensing the winding media over a drive mechanism prior to feeding the media onto the cables.

25. The method of claim 23, wherein the rotation of the platform is effected by engaging a motor and an operative drive mechanism.

26. The method of claim 23, further comprising the steps of:

sensing the speed of the cables propelled through the platform; and varying the speed of rotation of the platform.

27. The method of claim 21 further comprising the step of:

feeding the cables into a cable pushing machine.

28. The method of claim 21 further comprising pushing the cables into the duct.

29. The method of claim 21 further comprising feeding a plurality of winding media onto the cables from a coil mounted on the platform.

30. The method of claim 21 further comprising feeding a plurality of winding media onto the cables from a plurality of coils mounted on the platform.

31. The method of claim 21 further comprising a pulling system attached to a free end of the cable by a winch line such that the cable may be pulled in conjunction with the pushing action.

* * * * *